I. F. RANDOLPH,

Assignor to R. BAGALEY.

Apparatus for Lighting Railway-Cars.

No. 9,037. Reissued Jan. 6, 1880.

Witnesses.
R. H. Whittlesey
C. L. Parker

Inventor Ira F. Randolph,
By Attorney George A. Christy

UNITED STATES PATENT OFFICE.

IRA F. RANDOLPH, OF INDIANAPOLIS, INDIANA, ASSIGNOR TO RALPH BAGALEY, OF PITTSBURG, PENNSYLVANIA.

APPARATUS FOR LIGHTING RAILWAY-CARS.

SPECIFICATION forming part of Reissued Letters Patent No. 9,037, dated January 6, 1880.

Original No. 169,658, dated November 9, 1875. Application for Reissue filed December 11, 1879.

*To all whom it may concern:*

Be it known that I, IRA F. RANDOLPH, of Indianapolis, county of Marion, State of Indiana, have invented an Improved Apparatus for Furnishing Gas in Railroad-Cars, of which the following is a specification.

The object of my invention is to arrange a gas-generator in the saloon of a car, that being the most convenient place for the same, and connect it with an air-reservoir placed at any convenient place under the car, in such manner that the pressure of air in the reservoir, which is obtained from the air-brake mechanism, is carried to the gas-generator through suitable pipes, and having become mixed with gas from the oil in the generator passes thence to the burners. A safety-cock is also provided, which is used to cut off the supply of compressed air to the generator in case the car should become upset, as in an accident, so as thereby to extinguish the lights, and thus prevent the gas from setting the car on fire.

Figure 2:
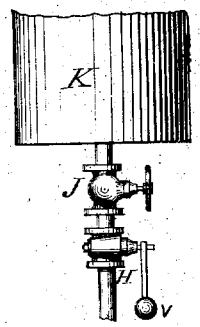
Figure 1:
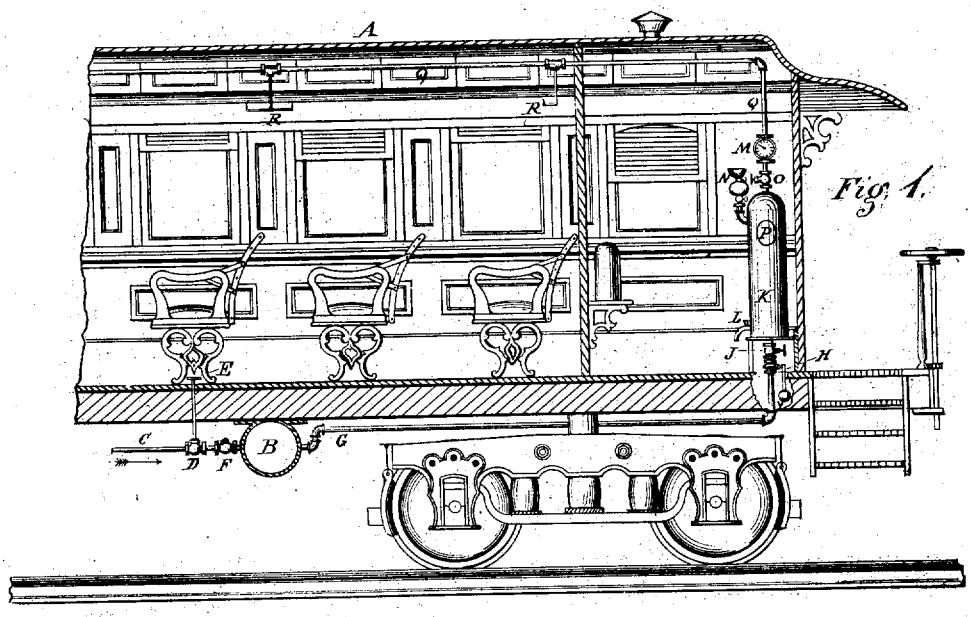

Figure 1 represents a sectional view of part of a car embodying my improvement. Fig. 2 represents the arrangement of the pressure-valve and safety cut-off cock below the gas-generator, but on an enlarged scale.

A represents the car. B is a reservoir, placed at any convenient place on or under the car, and into this reservoir the pipe C, with the valve D and check-valve F, enters. This pipe C conveys the air from any air-brake or air-pumping device into the reservoir, and the check-valve F holds it from leaking back.

The air is conducted from the reservoir B to the gas-generator K by means of the pipe G, and has to pass the safety-cock H and regulating-valve J.

The safety-cock H is provided with a weighted arm, V, which is always open when it hangs down, and is so arranged that while the car is in an upright position the ports are open, and the air flows freely through into the generator; but should the car turn over, as will sometimes happen in an accident, then the weighted arm will be carried to one side or the other and held there by a spring-catch, and shut the supply of air off from the generator K, and the lights will be extinguished. This safety-cock can be placed above the generator, if necessary.

P represents a hand-hole in the generator K, and is used to convey the materials that form the gas into the generator.

N represents an oil-valve to supply oil to the generator. L is a waste-cock, used to draw off any surplus oil that may accumulate in the bottom of the generator.

O is a valve in the pipe Q, and is used to regulate the flow of gas from the generator to the burners R R. M represents a regulating pressure-gage.

The operation of my improved apparatus is as follows: The reservoir B is charged with compressed air from any air-brake or air-pumping device; and if the reservoir is large enough to hold a supply sufficient to run all night, then the valve D can be closed by means of the extended stem E in the car, and this valve, in connection with the check-valve F, holds the air from leaking back. The air then passes through the pipe G into the generator K, and in its passage thereto it has to pass the safety-cock H and valve J. The gas that is generated in the generator mixes with the air from the reservoir and flows out of the generator under pressure, through the valve O, gas-regulator M, and pipe Q, to the burners.

In case the cars should be turned over, the weighted arm V on the safety-cock H turns to one side or the other, and the supply of air is cut off and the lights extinguished.

I do not broadly claim the air-reservoir or the gas-generator, as they are old; but I believe I am the first to combine a generator in which a hydrocarbon is to be converted into gas and mixed with air for car-lighting with an air-reservoir which is to be charged with air from the air-compressor of an air-brake apparatus, or with an air-pipe leading from such air-compressor, and as it is well known that a stored-up supply of compressed air is always carried in connection with air-brake apparatus, the utility and value of this feature of the invention will be readily apparent. I also believe I am the first to combine a safety-cock with an oil-gas generator and an air-reservoir of any kind.

What I claim as new, and wish to secure by Letters Patent, is—

1. The combination, with an oil-gas generator for a railway-car, of the safety-cock H and reservoir B for compressed air, substantially as and for the purpose set forth.

2. A hydrocarbon-gas generator arranged to receive air under pressure, to be mixed with the gas therein and conducted to the burners, in combination with an air-reservoir, B, connected with the air-brake mechanism of the train, substantially as set forth.

3. The combination of an oil-gas generator for a railway-car and an air-conduit leading thereto from the air-brake devices of the train, substantially as set forth.

In testimony whereof I have signed my name to this specification in the presence of two subscribing witnesses.

IRA F. RANDOLPH.

Witnesses:
R. H. WHITTLESEY,
GEORGE H. CHRISTY.